MULL & REED.
Spider.
No. 58,460.        Patented Oct. 2, 1866.
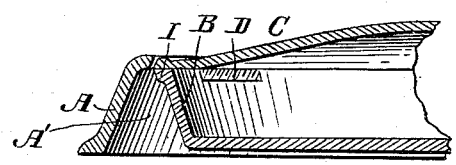
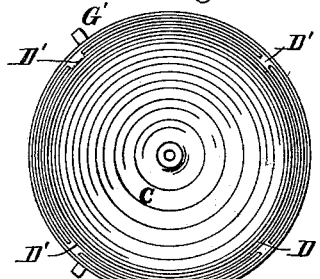
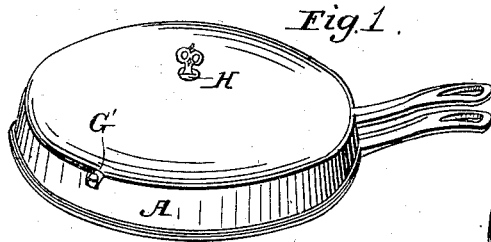
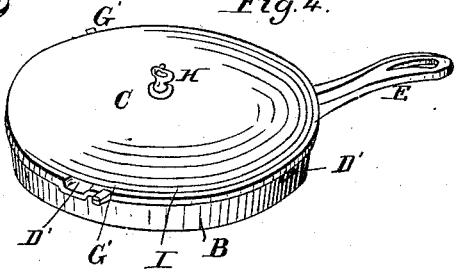
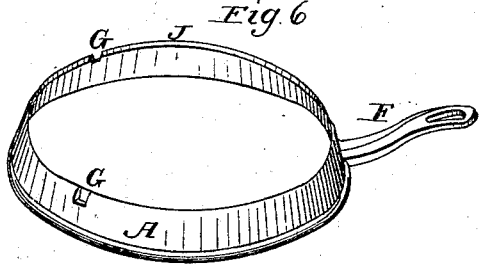
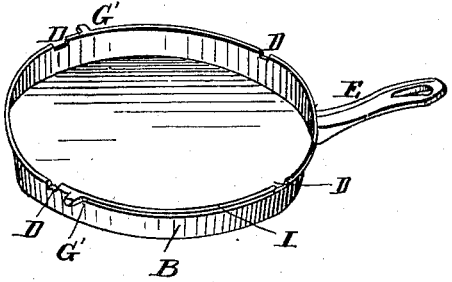
Witnesses:
Charles H Kellum
R H Reilly
Inventors:
Jonas Mull
Asa V Reed

United States Patent Office.

JONAS MULL AND ASA D. REED, OF TROY, NEW YORK.

IMPROVEMENT IN SPIDERS.

Specification forming part of Letters Patent No. 58,460, dated October 2, 1866; antedated September 23, 1866.

*To all whom it may concern:*

Be it known that we, JONAS MULL and ASA D. REED, of the city of Troy, in the county of Rensselaer, and State of New York, have invented a certain new and Improved Spider; and we do hereby declare that the following is a full, clear, and exact description of the same, reference being hereby had to the accompanying drawings, which make and form a part of this specification.

Like letters represent and refer to like or corresponding parts.

Figure 1 is a perspective view of my said spider, complete in all its parts. Fig. 2 is a section showing the spider or pan B with cover C, also outer rim A, each more fully hereinafter described and set forth. Fig 3 is an inside view of the cover C, showing the projection G', by which it rests upon the projections G on the spider or pan B, substantially as hereinafter described and set forth. Fig. 4 is a view showing the pan or spider B, with handle E, covered with the cover C, also showing the projections G' on the cover C resting on the projections G on the said spider or pan B. Fig. 5 is a perspective view of the said spider or pan B, showing the projections G', hereinbefore described, also the outlets D and handle E, each more fully hereinafter described and set forth. Fig. 6 is a view showing the outer rim A, within which rests the spider or pan B by means of the projections G', which rest within the recesses G upon the said outer rim A, each more fully hereinafter described and set forth.

The nature of my said invention and improvements in spiders consists in the employment of an outer rim A, with an inward-projecting flange J, in combination with a pan or spider, B, with an outward-projecting flange, I, by which means the smoke coming out of the apertures D, when the said spider is covered and in use, is, by the draft of the stove, drawn downward into the fire, and thence through the exit-pipe into the chimney.

To enable others skilled in the art to which my invention relates to make and use the same, I will here proceed to describe the construction and operation thereof, which is as follows, to wit:

A, Figs. 1, 2, 4, and 6, is the outer rim, in which the said pan or spider B is placed. It may be of any size or shape to conform with the size of the said spider or pan B. The said rim has recesses G cast upon each side of the same, in which the said pan or spider rests by means of the projections G' on each side of the said pan or spider B. The said pan or spider B is provided with outlets D, which are cast or filed upon the flange on the upper edge of the said spider. The said cover C is provided with similar outlets or openings D', so that when the said cover C is placed upon the said spider there will be outlets or openings formed just twice the size and capacity of the openings upon either the spider or the cover. When the said spider or pan is placed within the outer rim A the inward-turned flange on the said rim A and the outward-turned flange on the said pan or spider B come close together, thereby forming an almost air-tight joint between the same. The said openings or outlets D are below the said joint formed by the said flanges on the outer rim A and the spider B.

When it is desired to use my said improved spider for any culinary purposes for which it is adapted, the cover of the stove is taken off and the spider is placed directly over the fire, the said outer rim A resting upon the stove. The said cover C is then removed from the spider or pan B by means of the handle H. The meat or other article to be cooked is then placed within the said spider or pan B, and the said cover C is then put on. It now presents the appearance as seen at Fig. 1.

The smoke arising from the article being cooked passes through the apertures or outlets D, and is carried by the draft into the fire, and thence through the exit-pipe into the chimney, as fully hereinbefore described and set forth.

E and F are handles on the spider and outer rim, by which the same are moved from place to place, as may be required.

My said improved spider is made of cast-iron, and, being made strong in all its parts, is not liable to get out of order or break.

Having thus described our said invention and improvements, what we claim, and desire to secure by Letters Patent of the United States, is—

The employment of a spider for culinary purposes, constructed with an outward-projecting flange, I, with apertures D upon the upper edge thereof, and with the projections G', so as to suspend the said spider back of the center thereof, in combination with the outer rim A and surrounding or annular chamber A', each being arranged in the manner substantially as herein described and set forth.

In testimony whereof we have hereto set our hands this 9th day of October, A. D. 1865.

JONAS MULL.
ASA D. REED.

Witnesses:
CHARLES D. KELLUM,
R. W. REILLY.